United States Patent
Abi-Rached et al.

(10) Patent No.: US 9,753,546 B2
(45) Date of Patent: Sep. 5, 2017

(54) SYSTEM AND METHOD FOR SELECTIVE GESTURE INTERACTION

(71) Applicant: General Electric Company, Schenectady, NY (US)

(72) Inventors: Habib Abi-Rached, San Ramon, CA (US); Jeng-Weei Lin, Danville, CA (US); Sundar Murugappan, San Ramon, CA (US); Arnold Lund, Oakland, CA (US); Veeraraghavan Ramaswamy, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 14/473,909

(22) Filed: Aug. 29, 2014

(65) Prior Publication Data

US 2016/0062469 A1    Mar. 3, 2016

(51) Int. Cl.
*G06F 3/01*    (2006.01)
*G06F 3/03*    (2006.01)

(52) U.S. Cl.
CPC .............. *G06F 3/017* (2013.01); *G06F 3/011* (2013.01); *G06F 3/0304* (2013.01)

(58) Field of Classification Search
None
See application file for complete search history.

(56) References Cited

U.S. PATENT DOCUMENTS

| 7,770,136 B2 | 8/2010 | Beeck et al. |
| 8,522,308 B2 | 8/2013 | Stinson, III |
| 2004/0193413 A1* | 9/2004 | Wilson ............... G06F 3/017 704/243 |

(Continued)

FOREIGN PATENT DOCUMENTS

WO    WO-2013/038293 A1    3/2013

OTHER PUBLICATIONS

McDonald, C., et al., "Red-Handed: Collaborative Gesture Interaction with a Projection Table", Proceedings of the Sixth IEEE International Conference on Automatic Face and Gesture Recognition (FGR'04), (2004), 6 pgs.

(Continued)

*Primary Examiner* — Seokyun Moon
(74) *Attorney, Agent, or Firm* — Schwegman Lundberg & Woessner, P.A.

(57) ABSTRACT

A system and method for selective gesture interaction using spatial volumes is disclosed. The method includes processing data frames that each includes one or more body point locations of a collaborating user that is interfacing with an application at each time intervals, defining a spatial volume for each collaborating user based on the processed data frames, detecting a gesture performed by a first collaborating user based on the processed data frames, determining the gesture to be an input gesture performed by the first collaborating user in a first spatial volume, interpreting the input gesture based on a context of the first spatial volume that includes a role of the first collaborating user, a phase of the application, and an intersection volume between the first spatial volume and a second spatial volume for a second collaborating user, and providing an input command to the application based on the interpreted input gesture.

19 Claims, 10 Drawing Sheets

(56) References Cited

U.S. PATENT DOCUMENTS

| | | |
|---|---|---|
| 2010/0207874 A1 | 8/2010 | Yuxin et al. |
| 2010/0241999 A1 | 9/2010 | Russ et al. |
| 2011/0119640 A1* | 5/2011 | Berkes .................... G06F 3/011 715/863 |
| 2011/0193939 A1 | 8/2011 | Vassigh et al. |
| 2012/0306734 A1 | 12/2012 | Kim et al. |
| 2013/0307774 A1* | 11/2013 | Hayashi ................. G06F 3/017 345/158 |
| 2014/0104161 A1* | 4/2014 | Liao ........................ G06F 3/017 345/156 |

OTHER PUBLICATIONS

Tartari, G., et al., "Global Interaction Space for User Interaction with a Room of Computers", Proceedings of the 6th International Conference on Human System Interaction (HSI), Sopot, Poland, (Jun. 6-8, 2013), 84-89.

Vidakis, N., et al., "Multimodal Natural User Interaction for Multiple Applications: The Gesture—Voice Example", 2012 International Conference on Telecommunications and Multimedia (TEMU), (Jul. 30-Aug. 1, 2012), 208-213.

* cited by examiner

SYSTEM AND METHOD FOR SELECTIVE GESTURE INTERACTION

TECHNICAL FIELD

The present application relates generally to the technical field of data processing, and, in various embodiments, to a system and method for selective gesture interaction using spatial volumes.

BACKGROUND

A traditional human-machine interface, such as a command-line, menu-driven, or graphical user interface, receives user inputs via various channels, such as a mouse, a keyboard, and a touch-screen. However, this provides limitations in issuing commands to the interface, such as performing complex navigation, sorting and selection tasks. The use of spatial gestures has emerged to provide a natural and intuitive human-machine interaction under less constrained environments. A gesture is a natural body action that contains information (e.g., waving a hand to signify a greeting). Traditional spatial gesture-based interface systems respond to gestures in a spatial operating environment in an application. However, these systems detect and interpret both intentional and unintentional gestures as input commands to the application, thus misinterpreting random and unintended gestures as undesired input commands.

Furthermore, collaboration between users in one or more spatial operating environments to control common data or a common application via a device interface is not available. Normal human interaction between users during collaboration typically involves communication by words and by natural gestures (e.g., waving a hand to signify "good-bye"). However, it is difficult to distinguish a natural gesture used for communication between collaborating users from an intended gesture input since all gestures within the range of the sensing device are detected as user inputs. Therefore, natural gestures that are used for communication between collaborating users are less useful as intended gesture inputs. Instead, the intended gesture inputs are typically a collection of specific motions that must be memorized by the users, thus requiring significant effort on the part of the users to remember these gestures.

BRIEF DESCRIPTION

Some or all of the above needs or problems may be addressed by one or more example embodiments. Example embodiments of a system and method for selective gesture interaction using spatial volumes are disclosed.

In one example embodiment, a computer-implemented method comprises processing data frames that each includes one or more body point locations of a collaborating user that is interfacing with an application at each time intervals, defining a spatial volume for each collaborating user based on the processed data frames, detecting a gesture performed by a first collaborating user based on the processed data frames, determining the gesture to be an input gesture performed by the first collaborating user in a first spatial volume, interpreting the input gesture based on a context of the first spatial volume that includes one or more of a role of the first collaborating user, a phase of the application, and an intersection volume between the first spatial volume and a second spatial volume for a second collaborating user, and providing an input command to the application based on the interpreted input gesture.

The above and other features, including various novel details of implementation and combination of events, will now be more particularly described with reference to the accompanying figures and pointed out in the claims. It will be understood that the particular techniques, methods, and other features described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

Some embodiments of the present disclosure are illustrated by way of example and not limitation in the figures of the accompanying drawings, in which like reference numbers indicate similar elements, and in which.

Figure 1:
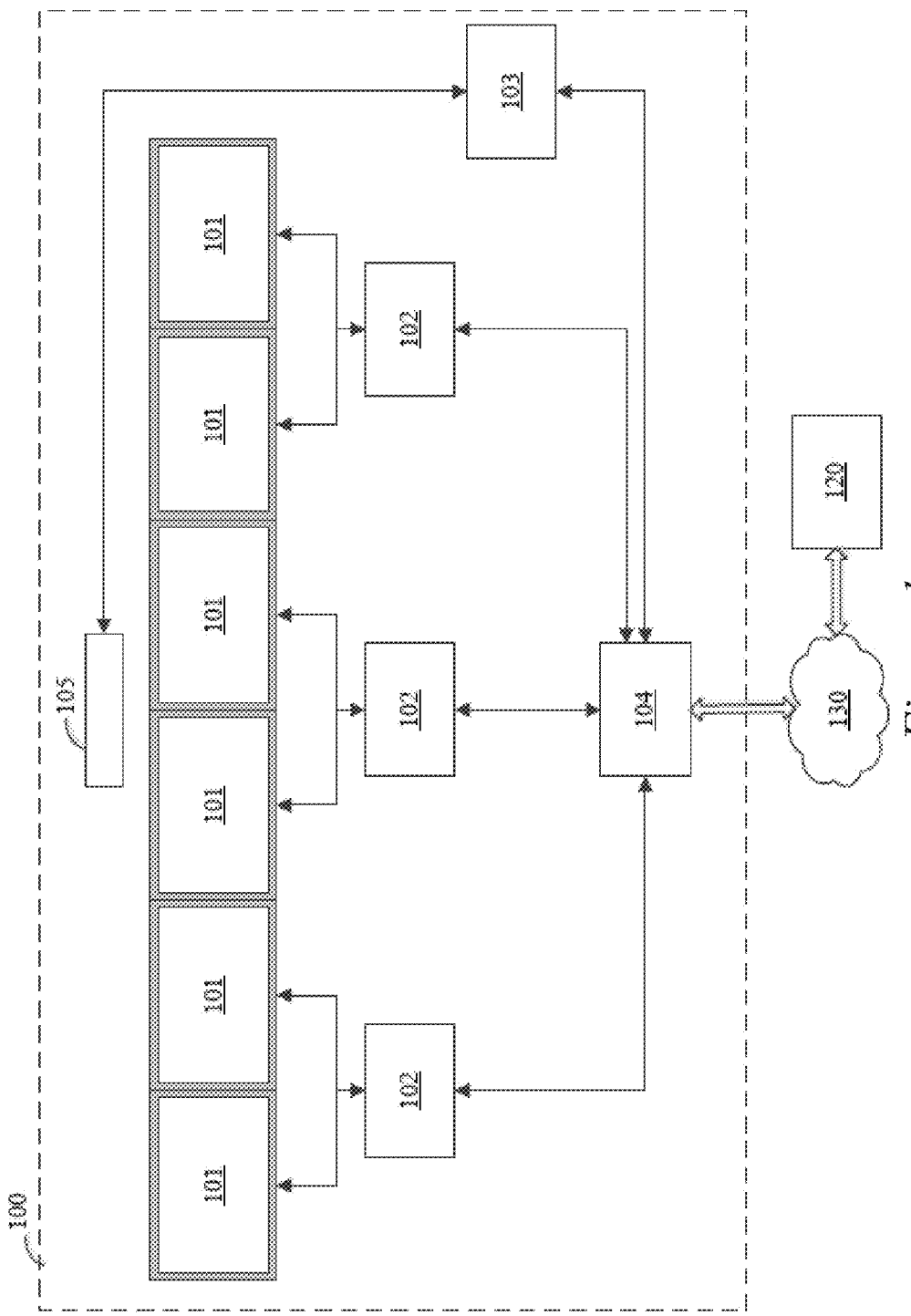
FIG. 1 illustrates an architecture of a spatial operating system, in accordance with some example embodiments.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Example systems and methods of selective gesture interaction are disclosed. In the following description, for purposes of explanation, numerous specific details are set forth in order to provide a thorough understanding of example embodiments. It will be evident, however, to one skilled in the art that the present embodiments can be practiced without these specific details.

A system and method for selective gesture interaction using spatial volumes is disclosed. The computer-implemented method includes processing data frames that each includes one or more body point locations of a collaborating user that is interfacing with an application at each time intervals, defining a spatial volume for each collaborating user based on the processed data frames, detecting a gesture performed by a first collaborating user based on the processed data frames, determining the gesture to be an input gesture performed by the first collaborating user in a first spatial volume, interpreting the input gesture based on a context of the first spatial volume that includes a role of the first collaborating user, a phase of the application, and an intersection volume between the first spatial volume and a second spatial volume for a second collaborating user, and providing an input command to the application based on the interpreted input gesture.

The technical effects of the system and method of the present disclosure are to enable collaboration between users in one or more spatial operating environments to control common data or a common application via a device interface, as well as to enable an application to distinguish a gesture intended as input from a natural gesture used for communication between collaborating users. Additionally, other technical effects will be apparent from this disclosure as well.

The methods or embodiments disclosed herein may be implemented as a computer system having one or more modules (e.g., hardware modules or software modules). Such modules may be executed by one or more processors of the computer system. In some embodiments, a non-transitory machine-readable storage device can store a set of instructions that, when executed by at least one processor, causes the at least one processor to perform the operations and method steps discussed within the present disclosure.

In the description below, for purposes of explanation only, specific nomenclature is set forth to provide a thorough understanding of the present disclosure. However, it will be apparent to one skilled in the art that these specific details are not required to practice the teachings of the present disclosure.

The example system and method described herein may provide a natural user interface that responds to spatial gestures of collaborating users. When a collaborating user performs a gesture in a specified space (herein referred to as a "spatial volume"), the present system and method can interpret the gesture to provide an input command to a software application/hardware device/data that the user is interfacing with.

FIG. 1 illustrates an architecture of a spatial operating system 100, in accordance with some example embodiments. The spatial operating system 100 can include six large calibrated display interfaces 101, where two display interfaces 101 are paired and coupled to each of three processors 102. While FIG. 1 only illustrates six display interfaces 101 that are connected to three processors 102, it is understood that the spatial operating system 100 can include any number of display interfaces 101 and couple them in any number of groups and couple each group to any number of processors 102. The three processors 102 share display information of a software application through Ethernet 104 to provide a parallel and continuous display across the six display interfaces 101.

The spatial operating system 100 can further include a sensing device 105 having a sensor mechanism that detects gestures. The sensing device 105 can include, but is not limited to, one or more image sensors (e.g., a visible light sensor, an infrared light sensor) and one or more three-dimensional (3D) sensors (e.g., a time-of-flight camera and a structured light device such as KINECT® manufactured by Microsoft Corporation of Redmond, Wash.). Although FIG. 1 only illustrates one sensing device 105, it is understood that the spatial operating system 100 can provide any number of sensing devices 105. According to one example embodiment, when a user performs a gesture, the sensing device 105 detects the user's gesture and provides a stream of data frames where each data frame includes an absolute distance from the sensing device 105 to a point location on a user's body (e.g., right hand, left shoulder, right wrist and head) at each of a plurality of time intervals. For example, the sensing device 105 can provide a stream of 30 data frames per second. The stream of data frames corresponding to one or more points on a user's body form a part or all of the gesture performed by the user in the user's spatial volume.

An exemplary data frame S may be of the format:

$$S=\{D_{1i}, D_{2i} \ldots D_{ni}, t_i\}$$

where $D_{ni}$ is an absolute distance from the sensing device 105 to a point location n on a user's body at a time $t_i$. $D_i$ may be represented by 3D-coordinates (e.g., x, y, z-coordinates).

A computer vision unit 103 can include a logic that receives and processes streams of data frames corresponding to various point locations on a user's body from the sensing device 105. The logic may be written in any programming language known to one ordinary skilled in the art, including, but not limited to, C, C++, and Java. According to one example embodiment, the computer vision unit 103 processes the streams of data frames corresponding to specific points on a user's body to determine that the user's gesture is intended for an input, and interprets the user's intended gesture to generate a corresponding input command to the software application running on one or more of the three processors 102 via Ethernet 104. The computer vision unit 103 may determine one or more body points of a user's body from each data frame. Body points can comprise points on the user's body, which can include reference points and control points. The computer vision unit 103 can determine a relative distance between a reference point and a control point of the user's body from each data frame. The computer vision unit 103 defines a spatial volume for the user based on a combination of the relative distances and absolute distances.

A mobile device 120 (e.g., a cell phone and a tablet computer) is connected to the Ethernet 104 of the spatial operating system 100 via a network 130, according to one example embodiment. The mobile device 120 provides an alternative user input (e.g., a mouse, a keyboard, and a touchscreen) to provide an input command to the software application. The combination of one or more of the above-mentioned user input methods including, but not limited to, a gesture, a mouse, a keyboard and a touchscreen, provides a multi-modal interface to enable collaboration between multiple users interfacing with the present spatial operating system.

According to one example embodiment, the spatial operating system intuitively recognizes the start of a gesture when the gesture is performed in a specified spatial volume. The specified spatial volume may be relative to a user, a device that the user is interfacing with, or an environment that the user is in.

Figure 2:
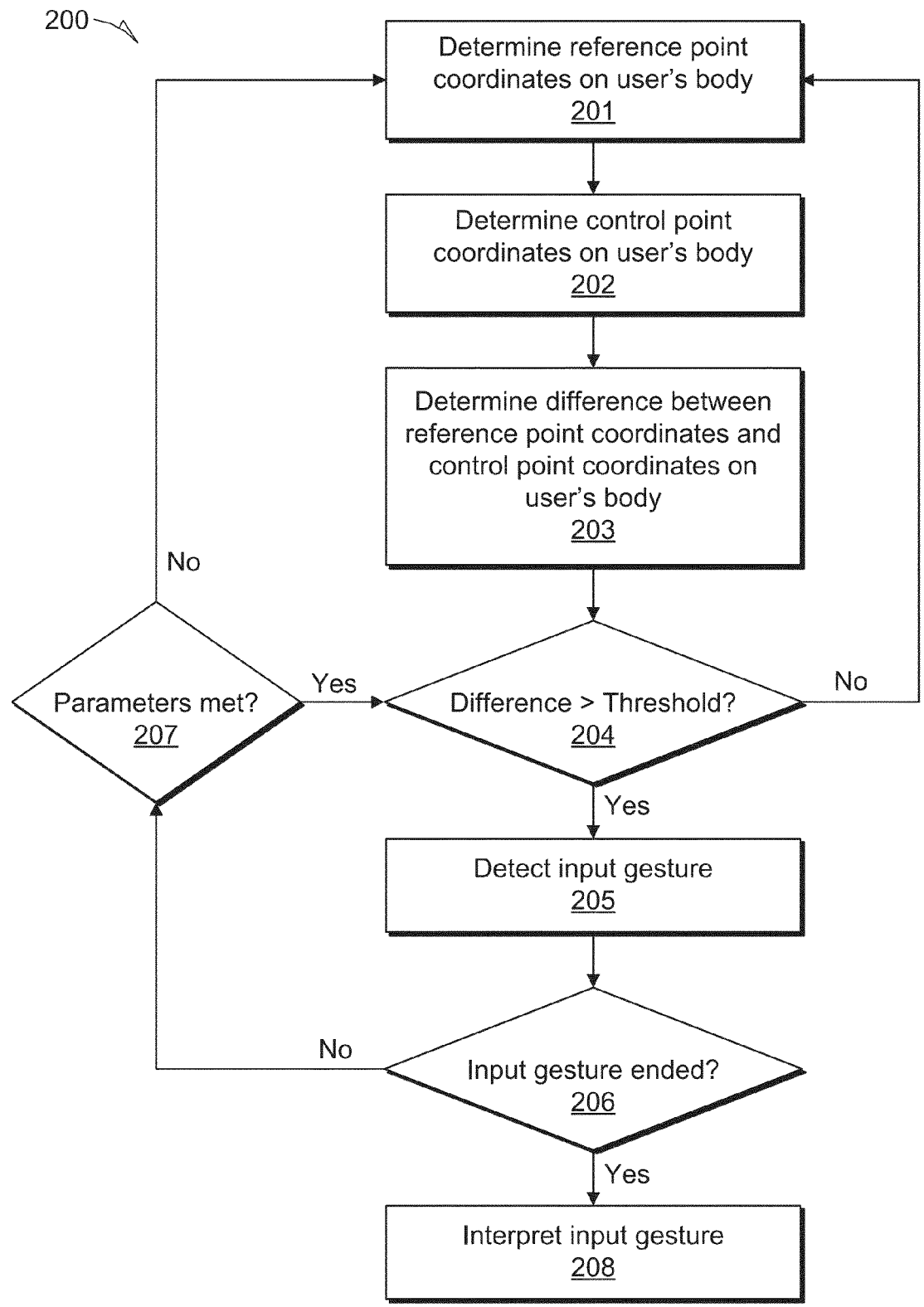
FIG. 2 is a flowchart illustrating a method, in accordance with some example embodiments, for detecting an input gesture.

FIG. 2 is a flowchart illustrating a method 200, in accordance with some example embodiments, for detecting an input gesture. At operation 201, the present spatial operating system can determine coordinates of a reference point on a user's body. At operation 202, the spatial operating system can determine coordinates for a control point on the user's body. For example, the system defines a reference point and a control point on the user's body as the user's right shoulder and the user's right wrist, respectively. At operation 203, the present spatial operating system can determine a difference between the coordinates of the reference point and the control point on the user's body (e.g., the distance between the reference point and the control point). According to one example embodiment, the present spatial operating system includes a sensing device that provides 3D-coordinates of the reference point and the control point. At operation 204, if it is determined that the difference satisfies a specified threshold function of a 3D location, then the present spatial operating system can starts to detect an input gesture in a spatial volume defined by the specified threshold function at operation 205. The specified threshold function provides a spatial volume so that a gesture performed within the spatial volume is detected as an input gesture.

In one example embodiment, the spatial operating system defines a spatial volume as a space in which the user performs gestures with his or her arm extended (e.g., at arm's length). In this case, the specified threshold function can be defined as a percentage (e.g., 80%) of the difference between the user's right shoulder (e.g., reference point) and the user's right wrist (e.g., control point) in order to be considered an arm's length. The spatial volume for the user is defined when the difference between the user's right shoulder and the user's right wrist exceeds the specified threshold function. Therefore, the spatial volume can be customized according to a user's arm length. In this respect, the spatial operating system can distinguish between gestures that are intended by the user to be input, which can be identified based on the location of the control point (e.g., the user's wrist) with respect to the reference point (e.g., the user's shoulder) being determined to satisfy the specified threshold function, and gestures that are not intended by the user to be input, which can be identified based on the location of the control point (e.g., the user's wrist) with respect to the reference point (e.g., the user's shoulder) being determined to not satisfy the specified threshold function. In the example of the spatial operating system defining a spatial volume as a space in which the user performs gestures with his or her arm extended (e.g., at arm's length), this threshold function can be based on a principle of the user's hand gestures away (e.g., at arm's length) from the user's shoulder are likely to be intended by the user as input gestures, whereas a user's hand gestures proximate the user's shoulder (e.g., a scratch of the chin or standard hand gestures that are made while talking) are likely to not be intended by the user as input gestures.

In another example embodiment, the specified threshold function may be a varying function of customizable parameters that render the spatial volume to be of any 3D shape (e.g., an ellipsoid). For example, the varying threshold function can be an equation of an ellipsoid as follows:

$$\frac{x^2}{a^2} + \frac{y^2}{b^2} + \frac{z^2}{c^2} > 1,$$

where parameters a, b and c are lengths along the respective x-axis, y-axis, and z-axis of a three-dimensional Cartesian coordinate system. The parameters a, b and c determine the shape of the surface of the ellipsoid. In this case the 3D shape is the exterior of an ellipsoid. The present spatial operating system can adjust parameters a, b and c from the above equation to adjust the shape of the principal semi-axes of the ellipsoid. According to one example embodiment, the threshold function may include, but is not limited to, a spline function, a Bezier function, a quadric function (e.g., paraboloid and hyperbolic) and any function describing a surface known to one ordinary skilled in the art.

Referring back to FIG. 2, at operation 206, it is determined whether or not the input gesture has ended. If it is determined that the gesture has not ended, as indicated by a detection by the sensing device, then the spatial operating system checks if parameters of the specified spatial volume are met at operation 207. In the above example, the parameters of the specified spatial volume are parameters a, b, and c that determine the shape of the surface of an ellipsoid. However, it is contemplated that other parameters are within the scope of the present disclosure. If it is determined that the parameters to the specific spatial volume are not met, then the method returns to operation 201, where reference point coordinates on the user's body are determined. If it is determined that the parameters to the specific spatial volume are met, the spatial operating system continuously checks if the difference is greater than the specified threshold at operation 204. If the difference is greater than the specified threshold, then the spatial operating system continues to detect the input gesture at operation 205. When it is determined that the input gesture has ended at operation 206, the present spatial operating system then interprets the input gesture at operation 208. It is contemplated that any of the other features described within the present disclosure can be incorporated into the method 200.

Figure 3:
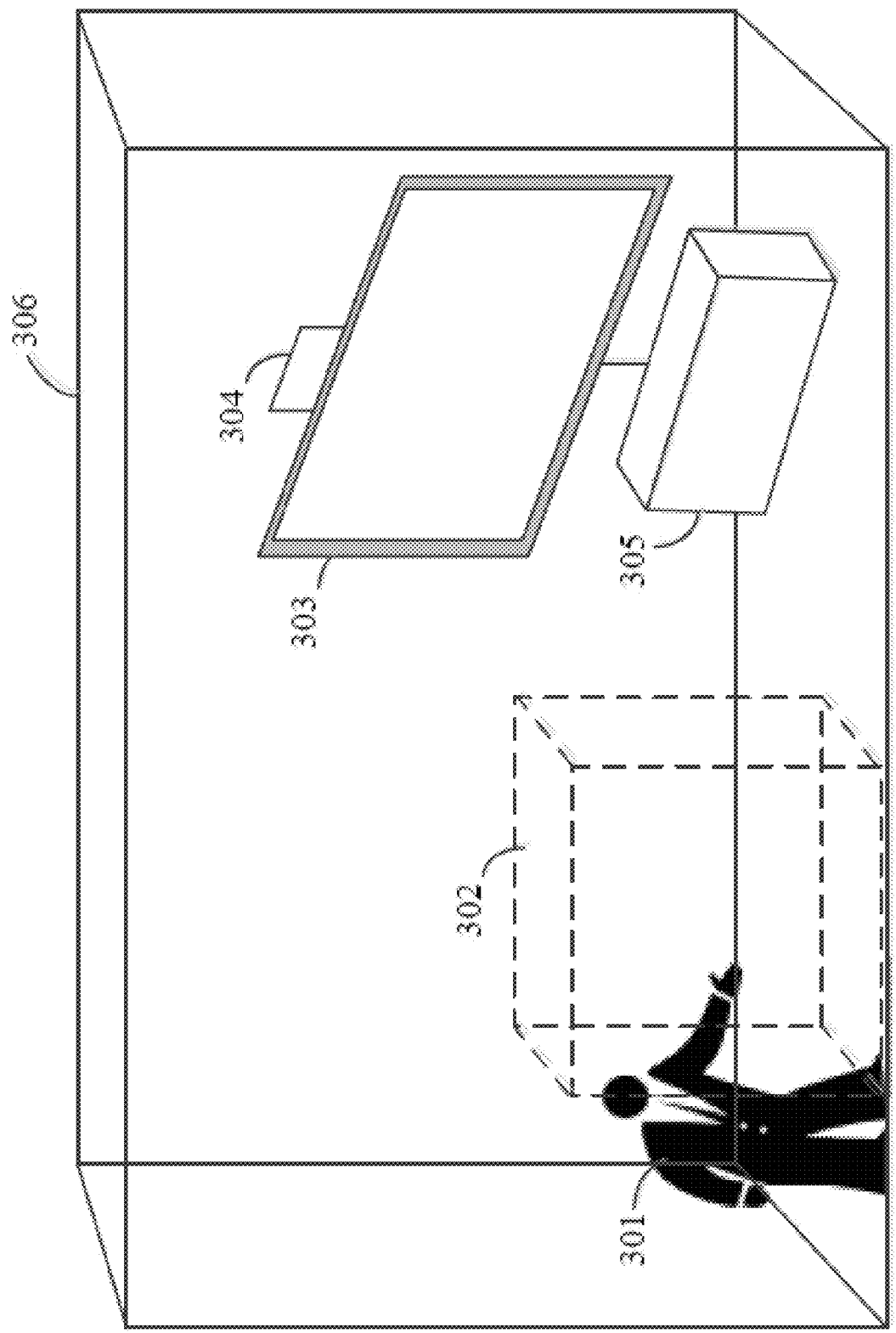
FIG. 3 illustrates a spatial volume, in accordance with some example embodiments.

FIG. 3 illustrates a spatial volume 302, in accordance with some example embodiments. A user 301 interfaces with a graphical user interface (GUI) on a display screen 303 that is communicatively coupled (e.g., electrically connected) to a spatial operating system 305 by performing gestures within the spatial volume 302. The spatial operating system 305 is communicatively coupled (e.g., electrically connected) to a sensing device 304 that detects gestures inside and outside of the spatial volume 302. However, the spatial operating system 305 only accepts gestures performed within the spatial volume 302 as input gestures. The gestures that are performed outside the spatial volume 302 are not interpreted as input gestures.

According to one example embodiment, the spatial volume 302 is a set of absolute spatial volumes that is defined in a fixed position within the range of the sensing device 304. For example, the spatial volume 302 is defined as a 3 meters×3 meters×3 meters cube located 1 meter in front of the sensing device 304. The location of the spatial volume 302 is fixed in space, and the user 301 must reach within the spatial volume 302 to provide input gestures.

In another example embodiment, the spatial volume 302 can comprise one or more of a set of relative spatial volumes includes, but is not limited to, a spatial volume that is relative to the user 301, a spatial volume that is relative to a part of a device that the user 301 is interfacing with (e.g., the display screen 303), and an environment that the user is in (e.g., a room 306). In another example embodiment, the spatial volume 302 is a spatial volume that is relative to a hardware device (e.g., a robot) or a graphical user interface presenting an application/data that the user 301 is interacting with. For example, the spatial volume 302 can be defined as a cube that has specific dimensions and is located eight inches in front of the user 301. As long as the user 301 is within the range of the sensing device 304 of the present spatial operating system 305, the present spatial operating system 305 always interprets gestures performed in the cube.

According to one example embodiment, the spatial volume 302 is a three-dimensional space with a customized size and shape. The spatial volume 302 may be an open or closed shape. In some example embodiments, the spatial operating system 305 provides a forward feedback (e.g., a sound, a touch feedback, and a visual display) to the user 301 when the user 301 enters the spatial volume 302. The forward feedback may be a multi-level signal that conveys to the user 301 where his or her hand is in the spatial volume 302, and where his or her hand is heading towards. According to one example embodiment, the forward feedback is a sound signal, where the frequency of the sound signal is a function of the depth of the user's hand to a relative position in the spatial volume 302. When the user performs a gesture by moving his or her hand through various depths in the spatial volume 302, the spatial operating system 305 provides a sound signal with corresponding frequencies that gives semantics to his gesture. For example, a low-pitched sound signal allows the user to know that his or her gesture is in the middle of the spatial volume, while a high-pitched sound signal allows the user to know that his or her gesture is at the edge of the spatial volume. According to another example embodiment, the spatial operating system 305 provides a forward feedback as a visual signal that is displayed on the display screen 303. The visual forward feedback can be further provided by a laser projector that projects an image of the gesture on a surface (e.g., planar and curved).

Figure 4:
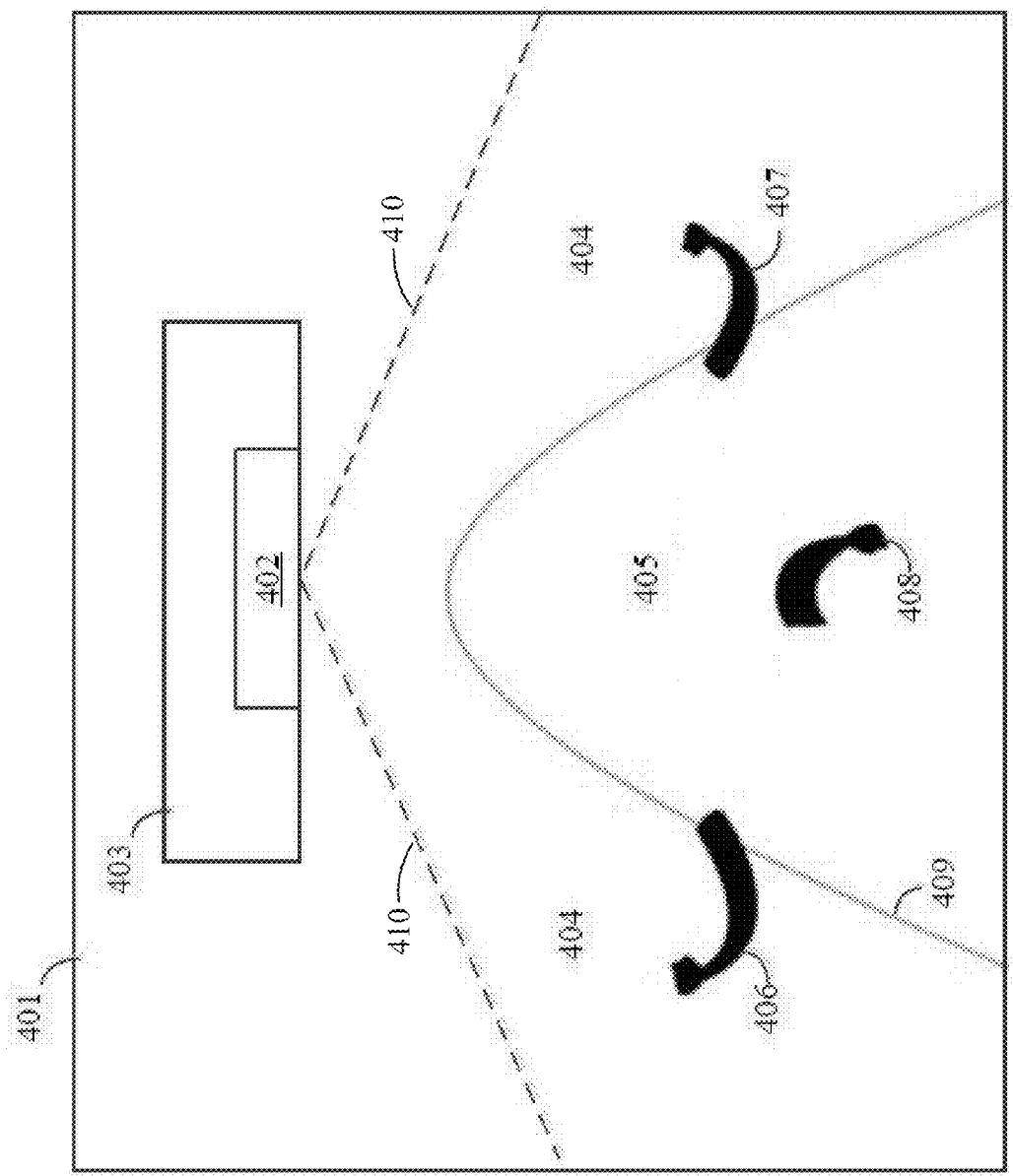
FIG. 4 illustrates a top view of a parabolic spatial input zone, in accordance with some example embodiments.

FIG. 4 illustrates a top view of a parabolic spatial input zone, in accordance with some example embodiments. A spatial operating system 403 is communicatively coupled (e.g., electrically connected) to a sensing device 402 that detects gestures within the range of the sensing device 402, as defined by the region below the dotted lines 410 and within the boundaries of a room 401. A parabolic arc 409 defines a spatial volume 404 within the range of the sensing device 402. The spatial operating system 403 interprets gestures 406 and 407 performed within the spatial volume 404 as input gestures. A gesture 408 that is made within a space 405 that is within the interior of the parabolic arc 409 is ignored by the spatial operating system 403. In this case, the shape of the spatial volume 404 is open and limited by the range of the sensing device 402 with respect to the exterior of the parabolic arc 409.

Figure 5:
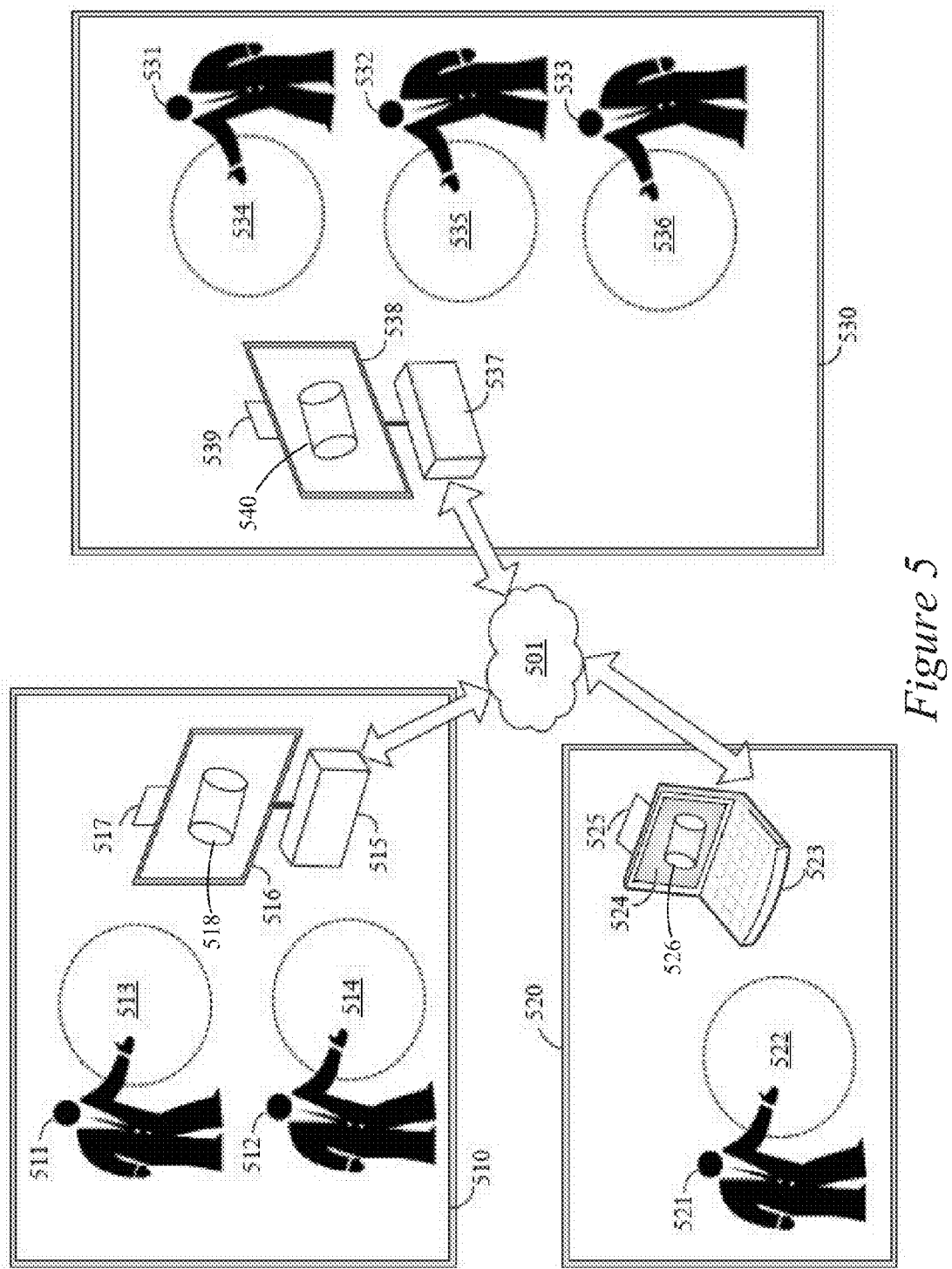
FIG. 5 illustrates a block diagram of user collaboration, in accordance with some example embodiments.

The present system may allow collaboration between multiple users interfacing with a software application via a device interface. FIG. 5 illustrates a block diagram of user collaboration, in accordance with some example embodiments. In room 510, users 511 and 512 interface with a software application via a GUI displaying an object 518 on a display screen 516 that is communicatively coupled (e.g., electrically connected) to a spatial operating system 515 by performing gestures within their respective spatial volumes 513 and 514. The spatial operating system is communicatively coupled (e.g., electrically connected) to a sensing device 517 that detects a stream of data frames from the gestures of users 511 and 512. The spatial operating system 515 processes the stream of data frames to determine that the gestures are intended input gestures, and interprets the input gestures to provide corresponding input commands to the software application.

The spatial operating system 515 may interpret a translation gesture performed by one or more users 511 and 512 in their respective spatial volumes 513 and 514 to move a display of the object 518 in the software application. The translation gesture may include translating a hand left/right/up/down to provide an input command. The spatial operating system 515 further interprets a rotation gesture performed by one or more users 511 and 512 in their respective spatial volumes 513 and 514 to provide an input command to rotate a display of the object 518 in the software application. The rotation gesture may include a hand motion rotating an imaginary sphere that is interpreted by the spatial operating system 515 based on a trackball algorithm scheme. The spatial operating system 515 further interprets a scale gesture performed by one or more users 511 and 512 in their respective spatial volumes 513 and 514 to provide an input command to scale a display size of the object 518 in the software application. The scale gesture may include adjusting a relative distance between the left and right hands of a user 511 and 512. For example, the farther the distance between a user 511's left and right hands, the bigger the size of the object 518. Thus, the spatial operating system 515 interprets one or more of the translation gesture, the rotation gesture and the scale gesture performed by users 511 and 512 in their respective spatial volumes 513 and 514 to provide input commands to manipulate the object 518 up to six degrees of freedom. The translation gesture may include two degrees of freedom (e.g., up/down and left/right). The rotation gesture may include three degrees of freedom for rotation about a vertical axis, a lateral axis, and a longitudinal axis of an object. For example, the rotation gesture may include rotation about three symmetry axes of an aircraft. The three symmetry axes include a yaw or vertical axis that is perpendicular to the body of the aircraft, a pitch or lateral axis that runs from wing to wing of the aircraft, and a roll or longitudinal axis that runs from the nose to the tail of the aircraft. The scale gesture may include one degree of freedom (e.g., zoom in/zoom out).

In room 520, user 521 interfaces with the same software application of room 510 via a GUI displaying an object 526 on a display screen 524 of a spatial operating system 523 running on a laptop by performing gestures within his/her spatial volume 522. The spatial operating system 523 is communicatively coupled (e.g., electrically connected) to a sensing device 525 that detects a stream of data frames from these gestures. According to one example embodiment, the spatial operating system 523 processes the stream of data frames to determine that the gestures are input gestures, and interprets the input gestures to provide corresponding input commands to the software application.

In one example embodiment, the spatial operating system 523 interprets a translation gesture performed by user 521 in his/her spatial volume 522 to provide an input command to move a display of the object 526 in the software application. The translation gesture may include translating a hand left/right/up/down. The spatial operating system 523 further interprets a rotation gesture performed by user 521 in his/her spatial volume 522 to provide an input command to rotate a display of the object 526 in the software application. The rotation gesture may include a hand motion rotating an imaginary sphere that is interpreted by the spatial operating system 523 based on a trackball algorithm scheme. The spatial operating system 523 further interprets a scale gesture performed by user 521 in his/her spatial volume 522 to provide an input command to scale a display size of the object 526 in the software application. The scale gesture may include adjusting a relative distance between the user 521's left and right hands For example, the farther the distance between user 521's left and right hands, the bigger the size of the object 526. Thus, the spatial operating system 523 interprets one or more of the translation gesture, the rotation gesture and the scale gesture performed by user 521 within his/her spatial volume 522 to provide input commands to manipulate the object 526 up to six degrees of freedom. The translation gesture may include two degrees of freedom (e.g., up/down and left/right). The rotation gesture may include three degrees of freedom for rotation about a lateral axis, a vertical axis, and a longitudinal axis of an object. For example, the rotation gesture includes rotation about three symmetry axes of an aircraft. The three symmetry axes include a pitch or lateral axis that runs from wing to wing of an aircraft, a yaw or vertical axis that runs perpendicular to the body of an aircraft, and a roll or longitudinal axis that runs from the nose to the tail (e.g., along the body) of an aircraft. The scale gesture may include one degree of freedom.

In room 530, users 531-533 interface with the same software application of rooms 510 and 520 via a GUI displaying an object 540 on a display screen 539 that is communicatively coupled (e.g., electrically connected) to a spatial operating system 537 by performing gestures within their respective spatial volumes 534-536. The spatial operating system 537 is communicatively coupled (e.g., electrically connected) to a sensing device 539 that detects a stream of data frames from the gestures. The spatial operating system 537 processes the stream of data frames to determine that the gestures are input gestures, and interprets the input gestures to provide corresponding input commands to the same software application. As described above, the spatial operating system 537 may interpret one or more a translation gestures, a rotation gesture and a scale gesture performed by users 531-533 in their respective spatial volumes 534-536 to provide input commands to manipulate the object 540 up to six degrees of freedom. While FIG. 5 only illustrates six users 511, 512, 521 and 531-533 in their respective spatial volumes 513, 514, 522, and 534-536, it is understood that the present system and method is scalable in that any number of spatial volumes can be defined in various shapes within a specified range of a given sensing device, and any number of users can perform gestures in any number of spatial volumes.

The spatial operating systems 515, 523, and 537 are connected together via a network 501 to enable the users 511, 512, 521 and 531-533 to collaborate and control the same software application. While FIG. 5 only illustrates three spatial operating systems 515, 523, and 537 that are located in three rooms 510, 520, and 530, it is understood that the present system and method is scalable in that any number of spatial operating systems located in any number of rooms can be connected together via a network 501 to enable user collaboration.

The users 511, 512, 521 and 531-533 may perform gestures to access a common set of input commands within all the spatial volumes 513, 514, 522, and 534-536. In another example embodiment, each user 511, 512, 521 and 531-533 performs gestures to access a different set of input commands within their respective spatial volume 513, 514, 522, and 534-536. In yet another example embodiment, some of the users 511, 512, 521 and 531-533 perform gestures to access a common set of input commands within their respective spatial volumes, while other users perform gestures to access a different set of commands. For example, a surgical team that collaborates on the same surgical operation includes surgeons, anesthesiologists and surgical assistants. The surgeons may perform gestures to access a common set of commands (e.g., control a laser medical equipment) within their own spatial volumes, while the anesthesiologists perform gestures to access a second set of commands (e.g., controls pain-numbing medication) within their own spatial volumes, and the surgical assistants perform gestures to access a third set of commands (e.g., monitors a patient's blood pressure) within their own spatial volumes.

In one example embodiment, the example system may allow collaborating users with different control menus based on their job roles. This allows one or more collaborating users to control different aspects of an application or a hardware (e.g., a robot, a machine, and a vehicle). For example, in the case of a collaboration for controlling a robot, a user may perform gestures to control the arms of the robot, while another user may perform gestures to control the visual input to the robot.

The spatial operating system may interpret gestures based on a collaborative job role context within the spatial volumes of collaborating users. The present spatial operating system may further include a facial recognition system that identifies a user by comparing the user's facial features obtained from an image of a video camera and a facial database, and matches the identity of the user to his/her role in the collaboration. The facial recognition system provides the identity-role match of the user to the present spatial operating system to determine the collaborative context. For example, the present spatial operating system determines a spatial volume for a user identified as a doctor, and accepts a gesture that is pre-defined for a doctor role. The spatial operating system may determine a different spatial volume for a user identified as a nurse, and accepts a gesture that is pre-defined for a nurse role.

Figure 6:
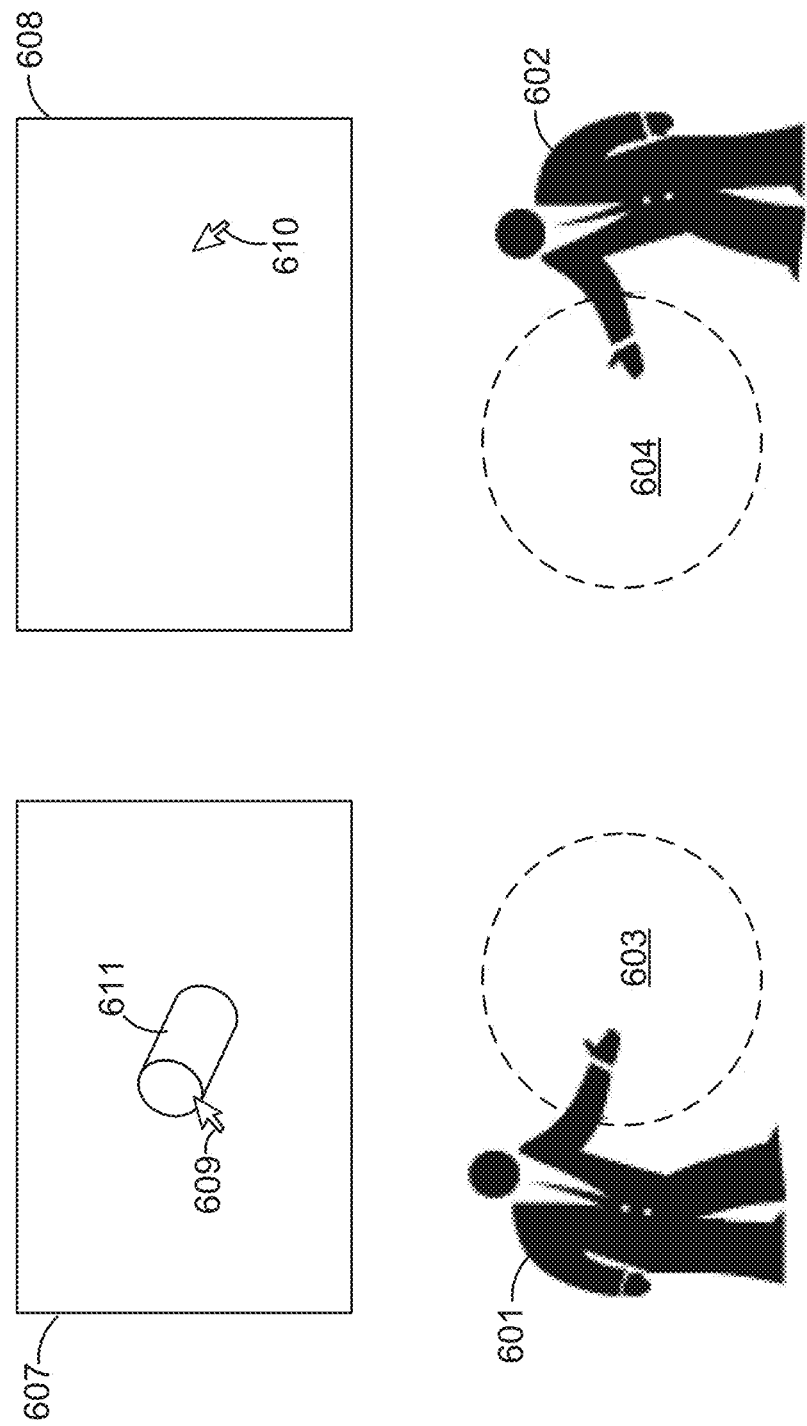
FIG. 6 illustrates a diagram of gesture interpretation within two separate spatial volumes, in accordance with some example embodiments.

The spatial operating system may interpret a gesture to provide a command based on the collaborative context within one or more spatial volumes. FIG. 6 illustrates a diagram of gesture interpretation within two separate spatial volumes 603 and 604, in accordance with some example embodiments. Two users, Peter 601 and John 602 are performing gestures within their respective spherical donut-like shaped spatial volumes 603 and 604. Peter 601 performs a moving finger pointing gesture that is pointed at a display screen 607. The display screen 607 displays a moving cursor 609 that is aligned with Peter's 601 pointed finger. The display screen 607 further displays an object 611. John 602 may also perform a moving finger pointing gesture that is pointed at a display screen 608. The display screen 608 displays another moving cursor 610 that is aligned with John's 602 pointed finger. Although FIG. 6 describes Peter 601 and John 602 pointing at separate display screens 607 and 608, it is understood that Peter 601 and John 602 may be pointing at the same display screen, without deviating from the scope of the present subject matter.

Figure 7:
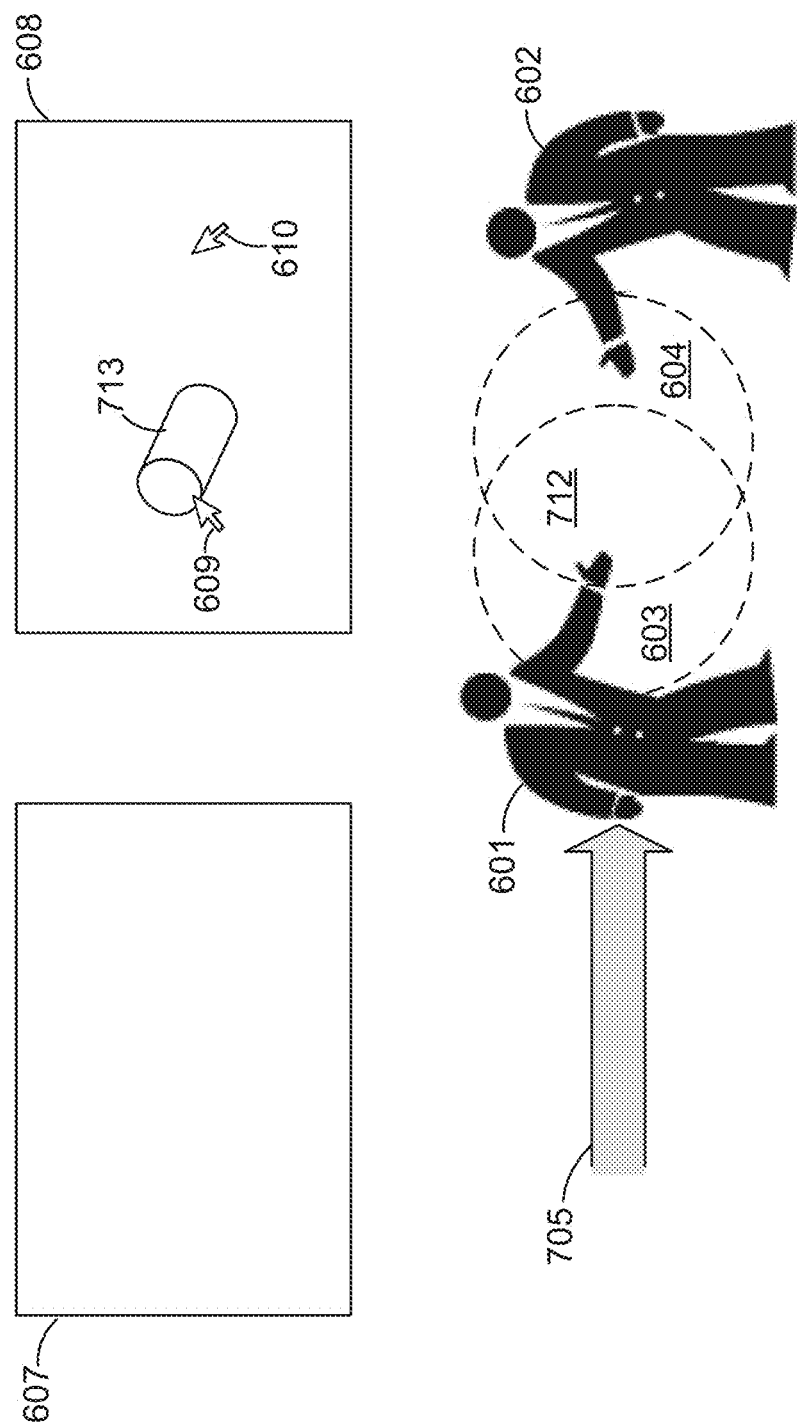
FIG. 7 illustrates a diagram of gesture interpretation within two intersecting spatial volumes, in accordance with some example embodiments.

FIG. 7 illustrates a diagram of gesture interpretation within two intersecting spatial volumes, in accordance with some example embodiments. After Peter 601, from FIG. 6, walks towards John 602, as indicated by the arrow 705 in FIG. 7, the spatial volume 603 moves with Peter 601 until there is an intersection volume 712 between the two spatial volumes 603 and 604. It is understood that the intersection volume 712 may alternatively be a result of John 602 walking towards Peter 601, or a combination of Peter 601 and John 602 walking towards each other. The present spatial operating system can determine the intersection volume 712 when the distance between Peter 601 and John 602 is less than the sum of the radius of the two spatial volumes 603 and 604. The present spatial operating system may determine the intersection volume 712 based on the shapes and sizes of the spatial volumes 603 and 604. The present spatial operating can determine the intersection volume 712, and then change the interpretation of the finger pointing gesture of Peter 601 within the intersection space 712 from a moving cursor on the display screen to a transfer of data. For example, in FIG. 6, Peter 601 points at the object 611, as indicated by the cursor 609 overlaying the object 611 on the display screen 607, when the two spatial volumes 603 and 604 are separate. When the present system determines the intersection volume 712 in FIG. 7, the object 611 disappears from the display screen 607 and re-appears as an object 713 on the display screen 608, indicating a transfer of the object 611. The present system can provide different interpretations of a gesture performed within spatial volumes during collaboration based on a collaborative context within the spatial input volumes, such as whether the collaborating users are looking at each other, and whether they are looking at a display interface. Therefore, a collaborating user does not need to perform a start gesture to indicate the type of the following gesture, since the collaborative context of the spatial volume infers the type of gesture required in the collaboration, thereby allowing the users' collaboration to be more natural and intuitive.

In an example embodiment, the spatial operating system may interpret a gesture performed in a spatial volume based on the phase of the application (e.g., a position of a hardware, a preceding task of the application that was performed). The spatial operating system can interpret the gesture to provide a command that accommodates the phase of the application. In another example embodiment, a user may switch between different spatial volumes by providing a user input command. For example, the user can provide a user input command by performing a lasso gesture that includes extending the user's hand into a spatial volume above the user's head, looping the user's hand in a circular motion and throwing the user's hand forward.

In an example embodiment, the system may provide input commands to an application that a user is interfacing with by interpreting gestures based on the application. In one example embodiment, the present system interprets gestures from a user (e.g., an engineer) to navigate and access electrical grid data of an electrical data application that may be displayed on a display screen. For example, the user can perform a hand translation left/right gesture to move data sidewise and parallel to the x-axis of the screen. The user may perform a hand translation up/down gesture to move data up/down and parallel to the y-axis of the screen. The user may perform a rotation gesture to rotate data, such as data displayed as a cylindrical object on a display screen. The rotation gesture includes a hand motion rotating an imaginary ball. The present spatial operating system can use a trackball algorithm that computes the equation to simulate a sphere around the displayed object being rotated, apply a set of projections of the position of the hand onto the sphere, and provide a quaternion computation of the shortest path of rotation, to simulate the motion of a hand touching a sphere, and rotating it from a point A to a point B, as the hand moves from point A to point B. The object being rotated is rotated in the same way that the simulated sphere is rotated. The user may perform scale gesture to adjust the size of data displayed on the screen. The scale gesture includes extending both hands forward till they enter a spatial volume, moving them away from each other to increase the size of the displayed data, and moving them towards each other to decrease the size of the displayed data. The user may perform a lasso gesture to provide a command for a display of a radial menu for push button functions on a display screen. The lasso gesture includes extending a user's hand into a spatial volume that is above the user's head and slightly behind the user, circling the hand in a clockwise/anticlockwise direction as if reaching for a lasso, and throwing the user's hand forward as if throwing a lasso.

According to one example embodiment, the present system interprets gestures for a healthcare application from a user (e.g., a physician) to navigate, access, and change viewing properties of patient records. For example, the user can perform a change transparency gesture to adjust the transparency of a three-dimensional model for a computed tomography (CT) scan. This allows the user to hide or expose the view of certain organs or tissues in the CT scan. The change transparency gesture can include extending a user's arm into a spatial volume and moving up along an arc to increase a transparency display, or moving down along the arc to decrease the transparency display. The user may further perform a change mode gesture to toggle a mode of navigation from inspecting a CT scan to moving the CT scan. The CT scan may be a three-dimensional volumetric rendering of the CT scan using voxel rendering from pixel data. The change mode gesture can include extending a user's hand into a spatial volume relative to the user, exiting the user's hand from the spatial volume, and re-extending the user's hand into the spatial volume again to toggle the mode of navigation. The present spatial operating system can provide a positive verbal feedback to indicate that the mode has been toggled from inspection to motion. The user may further perform a pointing gesture to align his/her extended arm to his/her index finger to point at a CT scan, or a particular region in the CT scan, or to configure a transparency to the mean of the region in the CT scan that is displayed on a display screen.

The present spatial operating system can establish a three-dimensional (3D) coordinate system in the user's environment (e.g., the user's room). For example, one example embodiment of an equation of a user's pointing line is as follows:

$$Ax+By+Cz=0,$$

where x, y, and z are coordinates, and A, B, and C are parameters.

The present spatial operating system can receive 3D coordinates determined by a sensing device, to determine parameters A, B, and C, from the equation of the pointing line so that the equation coincides with the extended arm of the user when the user is performing a pointing gesture at a CT scan that is displayed on a display screen. The present spatial operating system can further analyze the intersection of the line with the plane of the display screen to determine where the user is pointing at on the display screen.

In another example embodiment, the present system interprets gestures from a user (e.g., an engineer) to control an aircraft engine cylinder in an aviation application. For example, the user performs a picking gesture to select and visualize the engine's cylinder. The user may further perform a rolling gesture to roll the engine cylinder and visualize data on it. The user may further perform a throwing gesture to move the engine cylinder from a non-touch display interface to a second display interface for further inspection.

In another example embodiment, the present system provides a natural interface for a diagnostic machine (e.g., a magnetic resonance imaging (MRI) machine). This allows a user (e.g., a technologist) operating the diagnostic machine with an efficient and hygienic way of interacting with data without touching the machine. According to another example embodiment, the present system provides a natural interface for analyzing data. For instance, a user may perform gestures to interact with electrical grid data, including analyzing and visualizing multi-dimensional data such as factors that influence an electrical grid (e.g., vegetation, weather, and history of outrages). This helps users to visualize and collaborate with other users to optimize the analysis of the multi-dimensional data to prevent future outrages.

Figure 8:
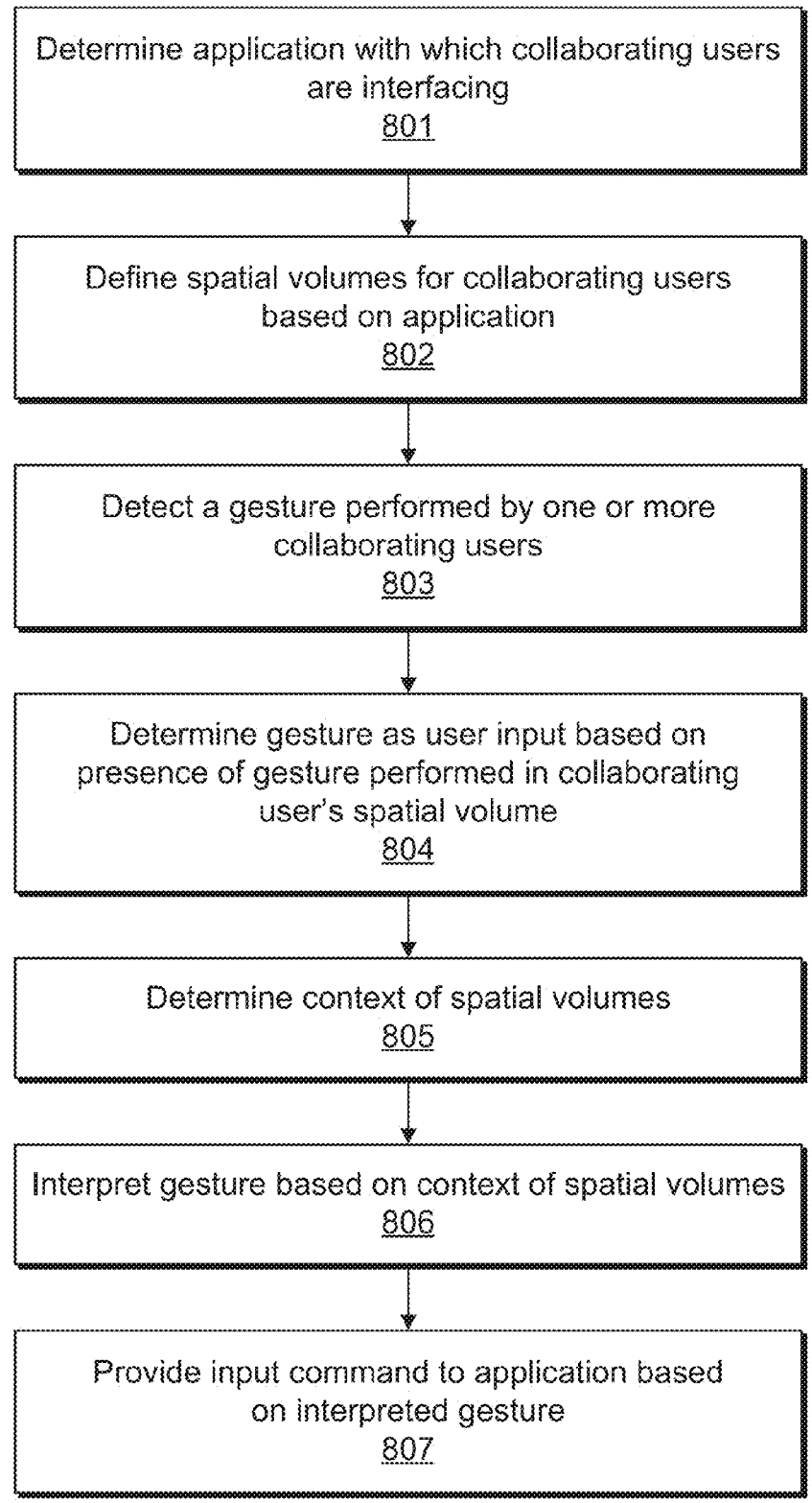
FIG. 8 is a flowchart illustrating a method, in accordance with some example embodiments, for determining an input command based on an input gesture.

FIG. 8 is a flowchart illustrating a method 700, in accordance with some example embodiments, for determining an input command based on an input gesture. At operation 801, the system determines an application via a display interface that a plurality of collaborating users is interfacing with. At operation 802, the system can define spatial volumes for each of the collaborating users based on the application. At operation 803, the system can detect a gesture performed by a collaborating user. At operation 804, the system can determine the collaborating user gesture to be an input gesture based on the presence of the gesture performed in his or her spatial volume. At operation 805, the system can determine the context of the spatial volumes for the collaborating users. The context of the spatial volume may be determined based on a role of the collaborating user in the application, the phase of the application, and an intersection volume between the spatial volumes of the collaborating user and a second collaborating user. At operation 806, the system can interpret the gesture based on the context of the spatial volume. At operation 807, the system can provide (e.g., transmit) an input command to the application based on the interpreted gesture. It is contemplated that any of the other features described within the present disclosure can be incorporated into the method 800.

The computer vision unit 103 in FIG. 1 and the spatial operating systems 305, 403, 515, 523, and 537 in FIGS. 3, 4, and 5, respectively, may comprise one or more modules (e.g., hardware modules or software modules). Such modules can be executable by one or more processors and configured to perform the functions described herein with respect to the computer vision unit 103 and the spatial operating systems 305, 403, 515, 523, and 537.

In one example embodiment, the system of the present disclosure may comprise a machine having at least one module. The module(s) may comprise at least one processor and be configured to perform any combination of one or more of the operations or functions disclosed herein, such as those discussed above with respect to FIGS. 1-8. For example, the module(s) may be configured to process a plurality of data frames, where each data frame of the plurality of data frames comprises one or more body point locations of each of a plurality of collaborating users that are interfacing with an application at each of a plurality of time intervals, define a spatial volume for each of the plurality of collaborating users based on the plurality of processed data frames, detect a gesture performed by a first collaborating user of the plurality of collaborating users based on the plurality of processed data frames, determine the gesture to be an input gesture based on the gesture performed by the first collaborating user in a first spatial volume, interpret the input gesture based on a context of the first spatial volume, the context of the first spatial volume comprising a role of the first collaborating user, and provide an input command to the application based on the interpreted input gesture.

Example Mobile Device

Figure 9:
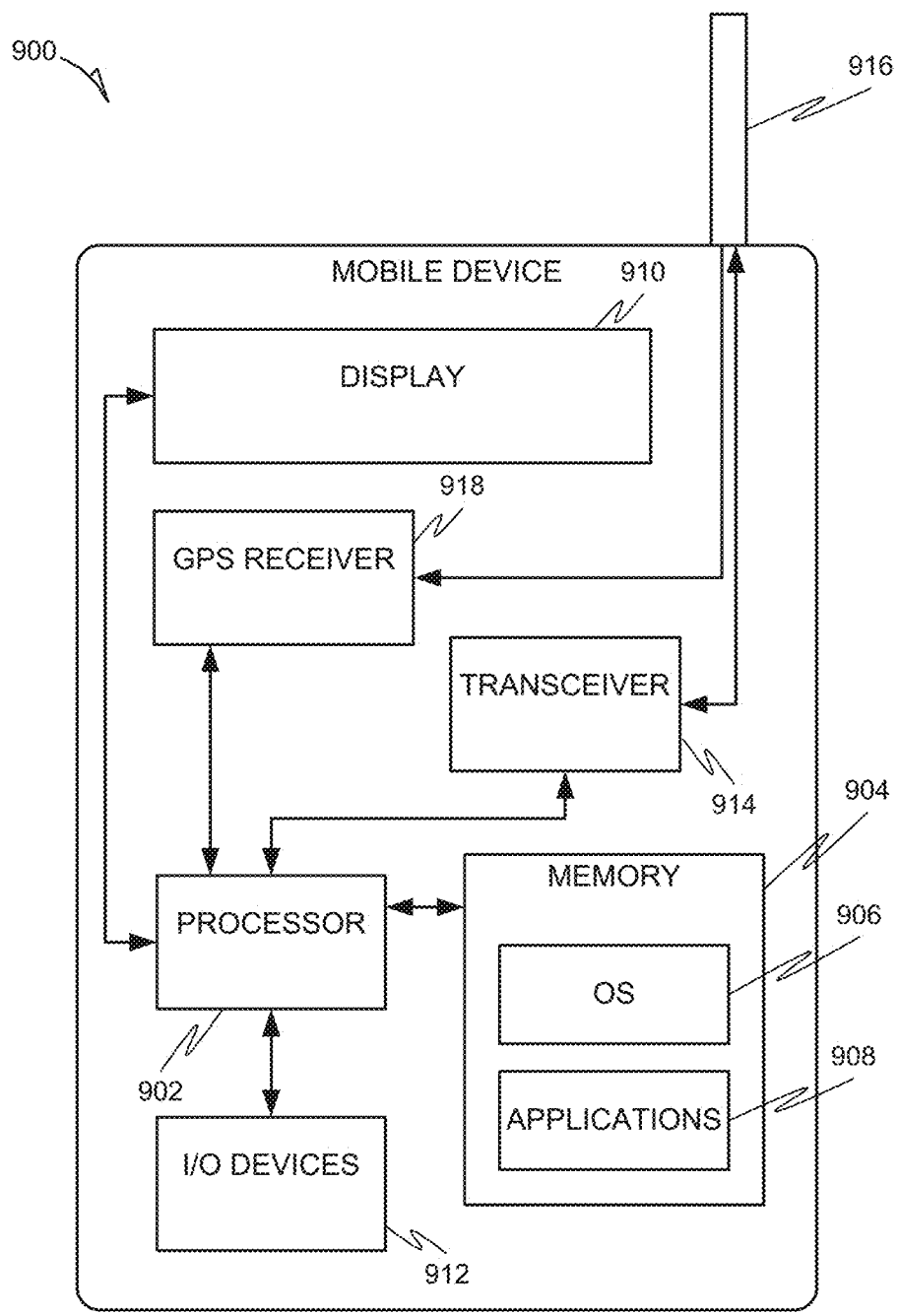
FIG. 9 is a block diagram illustrating a mobile device, in accordance with some example embodiments.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902.

The memory 904 can be adapted to store an operating system (OS) 906, as well as application programs 908, such as a mobile location enabled application that can provide LBSs to a user. The processor 902 can be coupled, either directly or via appropriate intermediary hardware, to a display 910 and to one or more input/output (I/O) devices 912, such as a keypad, a touch panel sensor, a microphone, and the like. Similarly, in some example embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
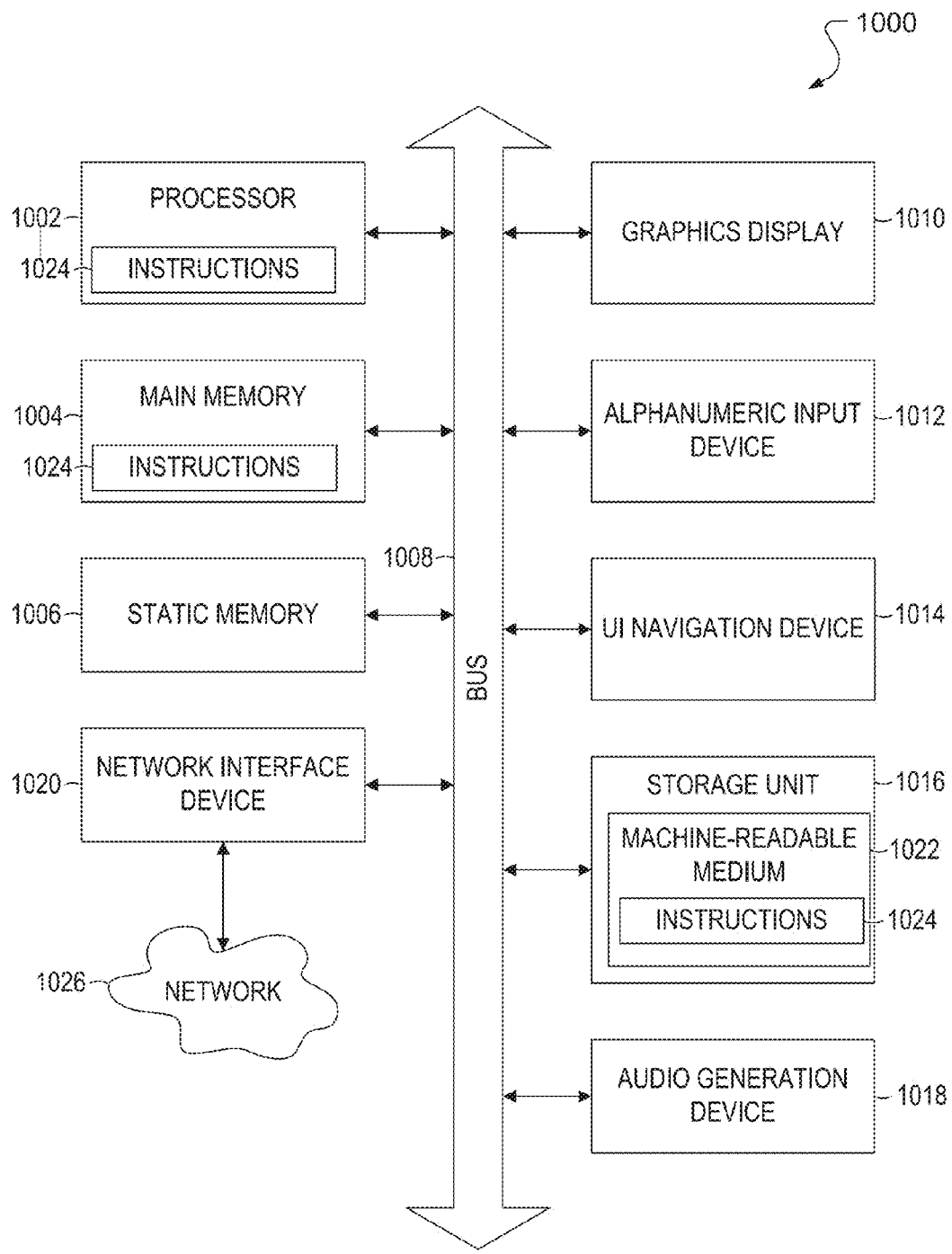
FIG. 10 is a block diagram of an example computer system, in accordance with some example embodiments, on which methodologies described herein can be executed.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
processing a plurality of data frames, each data frame of the plurality of data frames comprising one or more body point locations of each of a plurality of collaborating users that are interfacing with an application at each of a plurality of time intervals;
defining a spatial volume for each of the plurality of collaborating users based on the plurality of processed data frames;
detecting a gesture performed by a first collaborating user of the plurality of collaborating users based on the plurality of processed data frames;
determining the gesture to be an input gesture based on the gesture being performed by the first collaborating user in a first spatial volume;
interpreting, by a machine having a memory and at least one processor, the input gesture based on a context of the first spatial volume, the context of the first spatial volume comprising an intersection volume between the first spatial volume and a second spatial volume for a second collaborating user; and
providing an input command to the application based on the interpreted input gesture, the input command being different for the gesture being within the intersection volume than for the gesture being outside of the intersection volume.

2. The computer-implemented method of claim 1, wherein the context of the first spatial volume comprises a role of the first collaborating user.

3. The computer-implemented method of claim 2, further comprising determining the role of the first collaborating user based on an identification of the first collaborating user.

4. The computer-implemented method of claim 3, wherein the identification of the first collaborating user is determined based on facial recognition of the first collaborating user.

5. The computer-implemented method of claim 1, wherein the context of the first spatial volume further comprises a phase of the application.

6. The computer-implemented method of claim 1, wherein a body point location of the one or more body point locations is based on a distance between a body point of each of the plurality of collaborating users to a sensing device.

7. The computer-implemented method of claim 1, wherein the one or more body point locations comprise a reference point and a control point, and defining the spatial volume is further based on a distance between the reference point and the control point satisfying a threshold function.

8. The computer-implemented method of claim 7, wherein satisfying the threshold function comprises the distance exceeding a predetermined threshold distance.

9. The computer-implemented method of claim 1, wherein defining the spatial volume is further based on a measurement of a body part of the corresponding collaborating user.

10. The computer-implemented method of claim 1, wherein the first spatial volume comprises an absolute space at a fixed location.

11. The computer-implemented method of claim 1, wherein the first spatial volume comprises a space relative to the first collaborating user.

12. The computer-implemented method of claim 1, wherein the first spatial volume comprises one of a customized open shape and a customized closed shape.

13. The computer-implemented method of claim 1, wherein the input command comprises translating a display object of the application, and the input gesture comprises translating a first body point location.

14. The computer-implemented method of claim 1 wherein the input command comprises adjusting a size of a display object of the application, and the input gesture comprises adjusting the relative distance between a first body point location and a second body point location.

15. The computer-implemented method of claim 1 wherein the input command comprises rotating a display object of the application, and the input gesture comprises moving a first body point location along a surface of a sphere.

16. The computer-implemented method of claim 1, further comprising providing a forward feedback signal based on the input gesture the forward feedback signal being configured to convey where the input gesture is in the spatial volume, the forward feedback signal comprising one or more of a sound and a touch feedback.

17. A system comprising:
a machine having at least one module, the at least one module comprising at least one processor and being configured to:
process a plurality of data frames, each data frame of the plurality of data frames comprising one or more body point locations of each of a plurality of collaborating users that are interfacing with an application at each of a plurality of time intervals;

define a spatial volume for each of the plurality of collaborating users based on the plurality of processed data frames;

detect a gesture performed by a first collaborating user of the plurality of collaborating users based on the plurality of processed data frames;

determine the gesture to be an input gesture based on the gesture performed by the first collaborating user in a first spatial volume;

interpret the input gesture based on a context of the first spatial volume, the context of the first spatial volume comprising an intersection volume between the first spatial volume and a second spatial volume for a second collaborating user; and provide an input command to the application based on the interpreted input gesture, the input command being different for the gesture being within the intersection volume than for the gesture being outside of the intersection volume.

18. The system of claim 17, wherein the context of the first spatial volume further comprises a role of the first collaborating user, and the at least one module is further configured to determine the role of the first collaborating user based on an identification of the first collaborating user.

19. A non-transitory machine-readable storage medium, tangibly embodying a set of instructions that, when executed by at least one processor, causes the at least one processor to perform operations comprising:

processing a plurality of data frames, each data frame of the plurality of data frames comprising one or more body point locations of each of a plurality of collaborating users that are interfacing with an application at each of a plurality of time intervals;

defining a spatial volume for each of the plurality of collaborating users based on the plurality of processed data frames;

detecting a gesture performed by a first collaborating user of the plurality of collaborating users based on the plurality of processed data frames;

determining the gesture as an input gesture based on the gesture performed by the first collaborating user in a first spatial volume;

determining an input command based on an interpretation of the input gesture, the interpretation of the input gesture being based on a context of the first spatial volume, the context of the first spatial volume comprising an intersection volume between the first spatial volume and a second spatial volume for a second collaborating user; and transmitting the input command to the application based on the interpreted input gesture, the input command being different for the gesture being within the intersection volume than for the gesture being outside of the intersection volume.

* * * * *

UNITED STATES PATENT AND TRADEMARK OFFICE
CERTIFICATE OF CORRECTION

PATENT NO. : 9,753,546 B2
APPLICATION NO. : 14/473909
DATED : September 5, 2017
INVENTOR(S) : Abi-Rached et al.

Page 1 of 1

It is certified that error appears in the above-identified patent and that said Letters Patent is hereby corrected as shown below:

In the Claims

In Column 20, Line 46, in Claim 14, after "claim 1", insert --,--

In Column 20, Line 51, in Claim 15, after "claim 1", insert --,--

In Column 20, Line 58, in Claim 16, after "gesture", insert --,--

Signed and Sealed this
Twenty-eighth Day of May, 2019

Andrei Iancu
*Director of the United States Patent and Trademark Office*